Aug. 14, 1923.

M. J. HERZOG

PNEUMATIC TIRE

Filed May 29, 1922

1,464,709

INVENTOR
Michael J. Herzog
BY
Sigmund Herzog
ATTORNEY

Patented Aug. 14, 1923.

1,464,709

UNITED STATES PATENT OFFICE.

MICHAEL J. HERZOG, OF NEW YORK, N. Y.

PNEUMATIC TIRE.

Application filed May 29, 1922. Serial No. 564,405.

*To all whom it may concern:*

Be it known that I, MICHAEL J. HERZOG, a citizen of Hungary, and resident of the city of New York, in the county of New York and State of New York, have invented certain new and useful Improvements in Pneumatic Tires, of which the following is a specification.

The present invention relates to improvements in pneumatic tires for vehicles, as are generally used on automobile wheels. The invention relates more particularly to an armor device of the type which is in the form of a removable lining, to be applied within the outer tire shoe or casing and between the inner face of this casing and the commonly used inner inflatable rubber tube therein.

The main object of the invention is to provide a simple and inexpensive armor which is wholly made of rubber, so designed and constructed that, while preserving the ordinary resiliency of the tire construction, it effectively prevents the inner tube from punctures and blow-outs.

Another object of the invention is to provide means on the removable lining of the tire, which prevents the said lining from creeping circumferentially in relation to the shoe or casing.

A further object of the invention is to so construct the said lining that its inherent resiliency is greatly increased and its weight reduced.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 1:
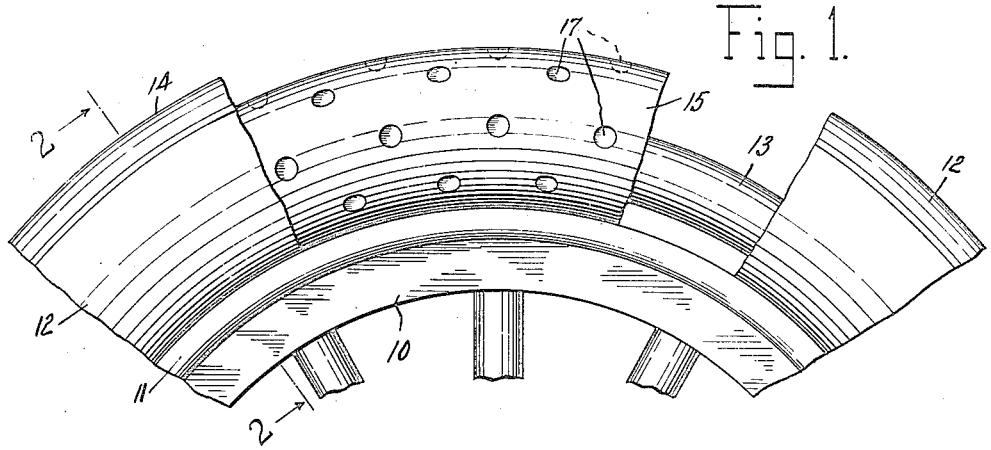
Figure 2:
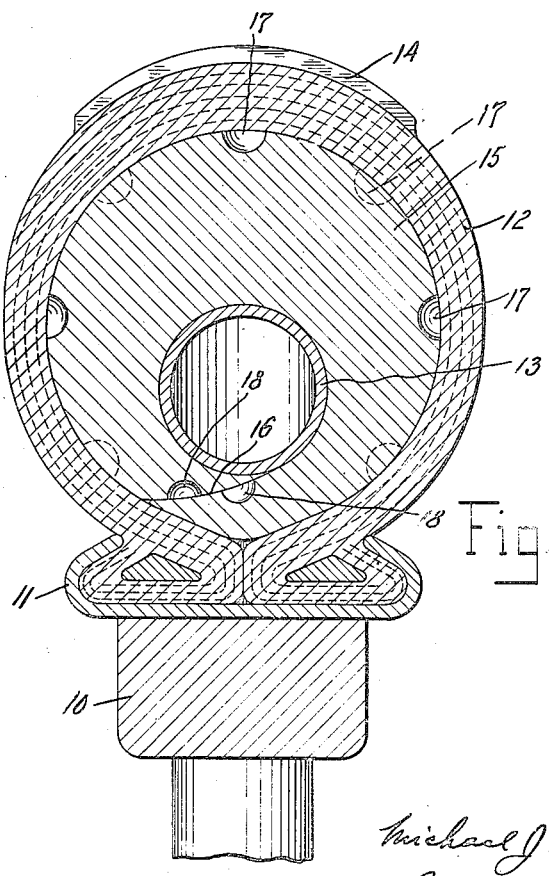

Figure 1 is a side elevation of a portion of a vehicle wheel with a tire constructed in accordance with the present invention in position thereon, portions of the said tire being broken away in order to more clearly show the interior construction; and Fig. 2 is a section taken on line 2—2 of Fig. 1, on a larger scale.

In the drawings, the numeral 10 indicates the felly of a vehicle wheel, provided with the usual metallic rim 11, on which is mounted in the well known manner the outer shoe or casing 12 of a pneumatic tire. This shoe may be of any suitable design and construction, it being composed of rubber and layers of fabric or cords in the well known manner. Eccentrically, in the transverse cross-section of the shoe, is placed within the said shoe on inflatable rubber inner tire tube 13. This tube is considerably smaller in transverse cross-section than those heretofore in common use, it being held, in a manner presently to be described, nearer the rim 11 than the tread surface 14 of the shoe. Between the shoe and the tube is disposed a lining 15, wholly composed of rubber, said lining forming a continuous annular removable body, that is split longitudinally, as shown at 16. The split portions overlap opposite the tread surface of the tire, that is to say adjacent the rim 11 of the wheel. The thickness of that portion of the lining which extends between the tread of the tire and the tube exceeds the diameter of the said tube in transverse cross-section, so that, when the tire shoe and lining are pierced by a nail of a size usually found on the road-bed, the said nail will not reach the tube 13. The lining protects thus the tube from punctures and blow-outs and effectively preserves the resiliency of the tire construction by reason of it being wholly made of rubber.

In the outer surface of the lining, that is to say in that surface thereof which contacts with the inner face of the shoe 12, there is formed a plurality of rows of small recesses 17, each of which is, preferably, hemi-spherical. These rows of recesses extend circumferentially all around the lining, the members of each row being spaced apart, preferably, equi-distantly. In each of the overlapping portions of the lining is also formed a row of recesses 18, and more particularly in those faces thereof which are in abutment one with another. The recesses 18 are in configuration similar to that of the recesses 17.

The purpose of the recesses 17 and 18 is two-fold, towit: First, they serve as suction devices, to prevent creeping of the lining circumferentially in relation to the shoe or casing 12, and, second, they increase the inherent resiliency of the lining. When, in the use of the tire, the lining is being compressed, as the wheel rolls along the road, the air is expelled partially from recesses 17. When thereafter the lining assumes its normal shape, a partial vacuum is created within the recesses, which causes the lining to cling or adhere to the shoe or casing 12, thereby preventing creeping of the said lining circumferentially in relation to the shoe. There being continuously a portion of the lining under compression and a continuous tendency of the lining to assume its normal shape, a few of the recesses 17 are always performing their work.

As above mentioned, the recesses 17 and 18 serve also to increase the inherent resiliency of the lining, they permitting the lining to be compressed and then again to recover to a greater degree than if the said lining were solid throughout. Incidentally, as a result of the said recesses, the lining is made lighter in weight.

It is to be observed that the lining does not add any excess weight to the tire, and, inasmuch as its split portions overlap, the tube 13 is protected from abrasion from foreign matter which may find its way into the shoe from the rim of the wheel. The split portions are caused to adhere to one another by the recesses 18 in the same manner as the lining is prevented from creeping in relation to the shoe.

Attention is called to the fact that, if the tube is accidentally deflated, the lining, by reason of its size, will still permit the wheel to be used, the lining forming a cushion sufficient to prevent a flattening of the tire and a cutting of the shoe by the rim 11.

From the foregoing it appears that the ordinary resiliency possessed by the wheel is not affected by the lining and that the latter is applicable to tires of any type and construction, it being capable of being adapted to tires already in use by substituting, for the ordinary tubes, inflatable tubes having a cross-section the diameter of which is considerably smaller than that of those heretofore in common use.

What I claim is:—

A tire comprising an outer shoe, an inner inflatable tube therein, and a resilient protective lining interposed between said shoe and tube, said lining forming a continuous annular longitudinally split removable body in close contact throughout its length with the inner face of said shoe and being provided in its face abutting against the inner face of said shoe with a plurality of recesses, the split portions of said lining overlapping opposite the tread surface of the tire and being provided in their abutting faces each with a plurality of recesses.

Signed at New York, in the county of New York and State of New York, this 4th day of April, A. D. 1922.

MICHAEL J. HERZOG.